No. 884,001. PATENTED APR. 7, 1908.
J. S. YOUNG.
STONE SAW.
APPLICATION FILED MAR. 15, 1907.
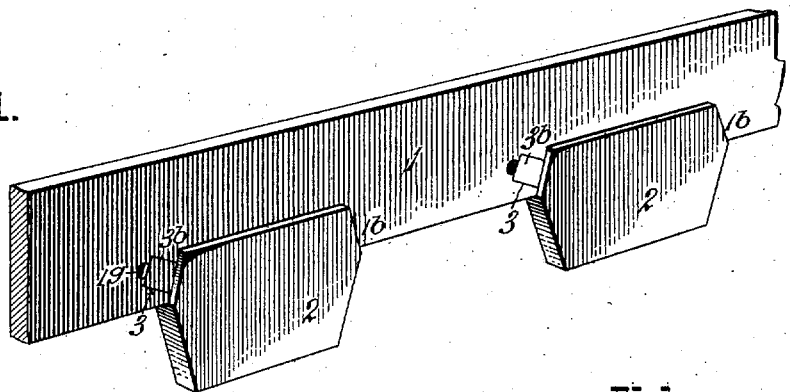
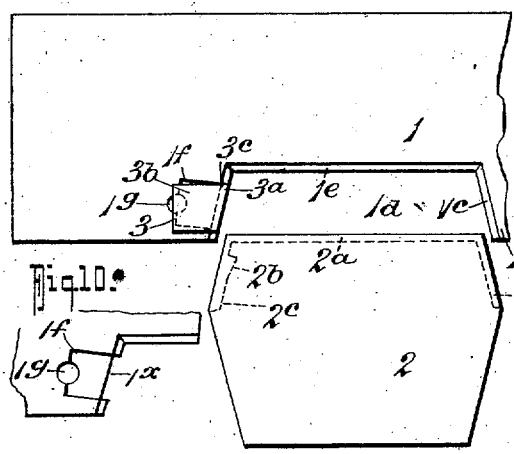
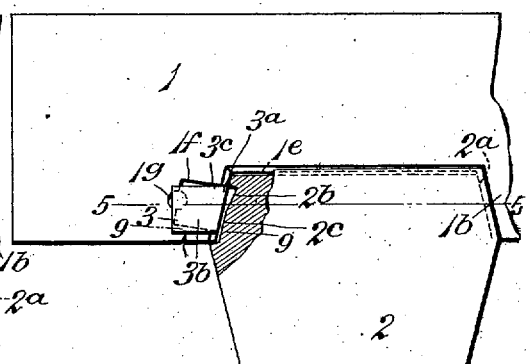
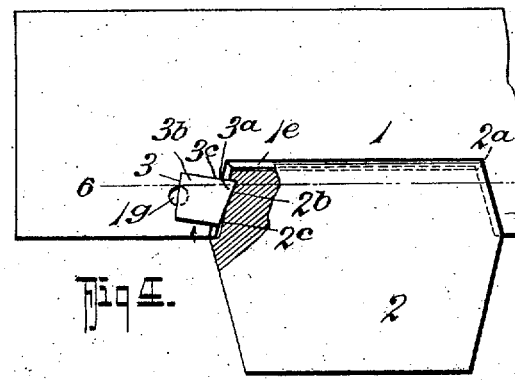
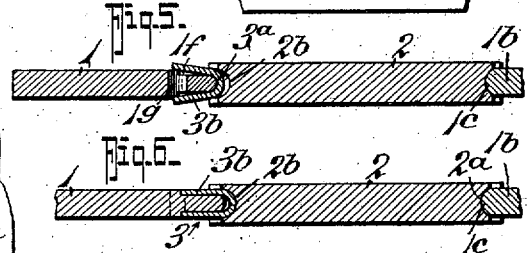
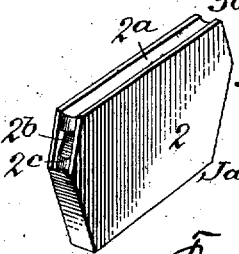
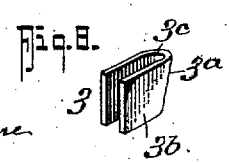
WITNESSES:
John T. Schrott
Daniel H. Kline
INVENTOR
James Sylvester Young
BY
Fred G. Dieterich
ATTORNEYS.

UNITED STATES PATENT OFFICE.

JAMES SYLVESTER YOUNG, OF BETHEL, VERMONT.

STONE-SAW.

No. 884,001.

Specification of Letters Patent.

Patented April 7, 1908.

Application filed March 15, 1907. Serial No. 362,531.

*To all whom it may concern:*

Be it known that I, JAMES S. YOUNG, residing at Bethel, in the county of Windsor and State of Vermont, have invented certain new and useful Improvements in Stone-Saws, of which the following is a specification.

My invention relates to certain new and useful improvements in stone sawing machines of the removable tooth type, and in its generic nature, my invention embodies a saw blade having tooth receiving cut-away portions, and removable blade carried means for locking the teeth.

In its more detail nature, my invention embodies a locking clip, preferably of spring steel or the like, which is adapted to interlock with the saw blade and with the tooth when the tooth is inserted in the blade to prevent the tooth dropping off the blade as the saw is being raised from the cut, or when the tooth moves out of contact with the stone during the sawing operation, as is sometimes done by the end tooth of the blade.

Primarily, my invention has for its object to provide a saw blade constructed along the lines hereinbefore indicated, of a very simple and effective construction, which can be easily manufactured, and which will readily and effectively serve its intended purposes, and in its specific nature, the invention embodies certain novel details of construction, arrangement and combination of parts, all of which will be first described in detail, and then be specifically pointed out in the appended claims, and illustrated in the accompanying drawings, in which—

Figure 1, is a perspective view of a saw blade showing my invention applied for use. Fig. 2, is a side elevation of a portion of the saw blade with the securing clip in its initial position, and the tooth about to be inserted in the blade notch. Fig. 3, is a similar view showing the tooth inserted. Fig. 4, is a view similar to Fig. 3, after the clip has been moved into its pocket to lock the tooth to the blade. Fig. 5, is a horizontal section on the line 5—5 of Fig. 3. Fig. 6, is a horizontal section on the line 6—6 of Fig. 4. Fig. 7, is a perspective view of one of the teeth. Fig. 8, is a perspective view of one of the securing clips. Fig. 9, is a section on the line 9—9 of Fig. 3. Fig. 10, is a detail side view of a portion of the saw blade.

Referring now to the accompanying drawings in which like letters and numerals of reference indicate like parts in all of the figures, 1 designates the saw blade which is provided with a series of tooth receiving portions $1^a$, cut in the under side of the blade, having their sides $1^b$, converging upwardly and provided with tongues $1^c$, as shown. The upper bounding surfaces of the tooth receiving pockets $1^d$ may be provided with tongues $1^e$, if desired.

$1^f$ designates pockets formed in the saw blade adjacent the tooth receiving spaces $1^d$, which pockets $1^f$ are countersunk into the saw blade a depth sufficient to receive the securing clips 3, which clips 3 are of substantially U-shape in cross section, and are preferably formed of spring steel or other suitable material, and when the clips 3 are in the pockets $1^f$ they snugly fit the same.

It will be noticed that the pockets $1^f$ slant slightly upward for a purpose which will presently appear and the saw blade may be provided with apertures $1^g$ merging with the pockets $1^f$ for a purpose which will readily appear.

The teeth 2 may be of any desired type and cut to fit the spaces $1^d$, and the teeth 2 may be provided with grooves $2^a$ to correspond with and interlock with the tongues on the saw blade.

The edge of the tooth which lies adjacent the pockets $1^f$ when in the saw blade, is provided with a notch $2^b$, whose face may be provided with a groove $2^c$, if desired, the notch $2^b$, serving to receive the edge $3^a$ of the clip 3 whose sides $3^b$ are adapted to lie in the pockets $1^f$, when the tooth is locked in the blade. In inserting the tooth into the blade, the clip 3 is first shoved into the position shown in Fig. 2, so that its sides or wings $3^b$ will be spread and so that its edge $3^a$ will lie parallel and close up to the edge $1^b$ of the tooth receiving portion of the saw blade and in the recess $1^\times$ thereof, so that the tooth 2 can be slid in place, as shown in Fig. 3, after which, by forcing the clip 3 in the direction of the arrow, it will be made to register with the pockets $1^f$ and its arms $3^b$ will spring into the pockets $1^f$ and thus cause the upper edge $3^c$ of the clip 3 to project into the notch $2^b$ of the tooth 2 as indicated in Fig. 4, to lock the tooth in the blade.

To remove the tooth when it is desired to do so, for any purpose whatsoever, it is only necessary to insert a prying instrument beneath the wings 3, so that the clip can be moved out of the pockets 1ᶠ back to the position shown in Fig. 2, to withdraw the edge 3ᶜ from the notch 2ᵇ, and release the tooth.

From the foregoing description taken in connection with the accompanying drawings, it is thought the complete construction, operation and numerous advantages of my invention will be readily understood by those skilled in the art to which the invention appertains.

What I claim is:

1. In a stone saw, the combination with the saw blade having tooth receiving portions and parallel recesses in its side faces merging with said tooth receiving portions, of teeth held in said tooth receiving portions, means coöperatively engaging the teeth and resting in said recesses for locking the teeth in the saw blade.

2. A saw blade having tooth receiving spaces and teeth adapted to be held in said spaces, said saw blade having recesses in its side faces merging with said tooth receiving spaces, combined with a locking clip removably held on the saw blade and adapted to embrace the sides thereof and engage a notch in the tooth to lock the teeth to the blade, substantially as shown and described.

3. A saw blade having tooth receiving cut-away portions whose side walls converge upwardly, saw teeth held in said cut-away portions, said teeth having notches and said saw blade having recesses in its side faces and U-shaped clips held over said blades in said recesses to lock in the notches of the teeth.

4. A saw blade having tooth receiving cut-away portions, saw teeth held in said cut-away portions, said saw teeth having notches, said blade having recesses in its cut-away edge and in its side faces adjacent said cut-away portions, and spring metal clips bent over said saw blade in said recesses to lock in the notches of the teeth.

5. A saw blade having tooth receiving cut-away portions, saw teeth held therein, said saw teeth having notches combined with U shaped spring metal clips held over said saw blades and embracing the sides thereof, and coöperatively locking in the notches of the teeth, substantially as shown and described.

6. A saw blade having tooth receiving cut-away portions, saw teeth held therein, said saw teeth having notches combined with U shaped spring metal clips held over said saw blades and embracing the sides thereof and coöperatively locking in the notches of the teeth, said saw blade having recessed portions on its side face to be engaged by said clips when in their locking position, substantially as shown and described.

7. A saw blade having tooth receiving cut-away portions, saw teeth held therein, said saw teeth having notches combined with U shaped spring metal clips and coöperatively locking in the notches of the teeth, said saw blade having recessed portions on its side face to be engaged by said clips when in their locking position, and having a supplemental notched portion to receive said spring metal clip in its unlocked position substantially as shown and described.

JAMES SYLVESTER YOUNG.

Witnesses:
HARRIET M. YOUNG,
A. E. DIETERICH.